Oct. 29, 1940.  F. R. SWANSON  2,219,343
MACHINE FOR RAISING SPINES
Filed March 3, 1939   7 Sheets-Sheet 4
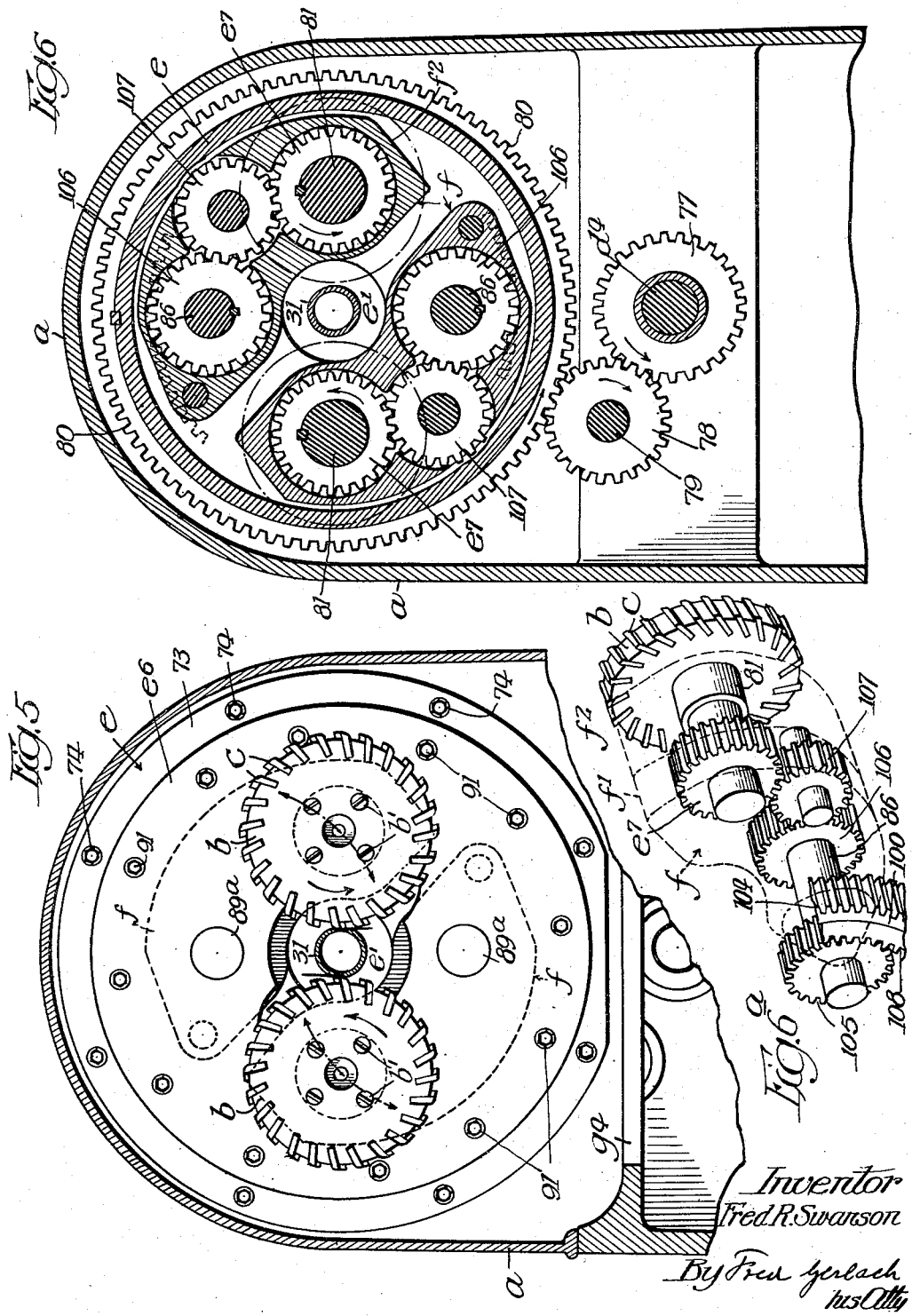
Inventor
Fred R. Swanson
By Fred Gerlach
his Atty Oct. 29, 1940.    F. R. SWANSON    2,219,343
MACHINE FOR RAISING SPINES
Filed March 3, 1939    7 Sheets-Sheet 5
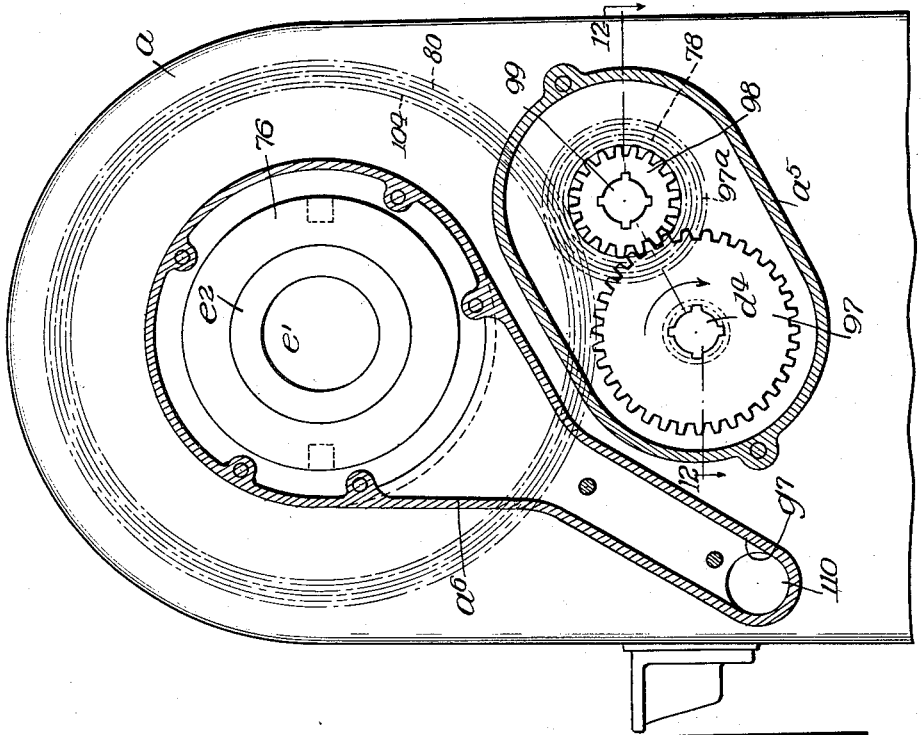
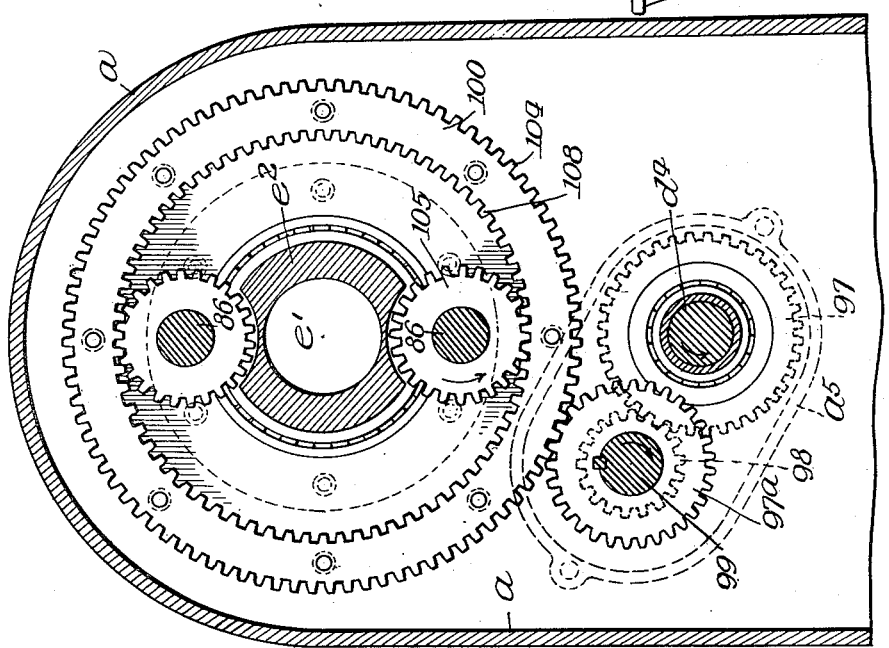
Inventor:
Fred R. Swanson
By Fred Gerlach
his Atty.

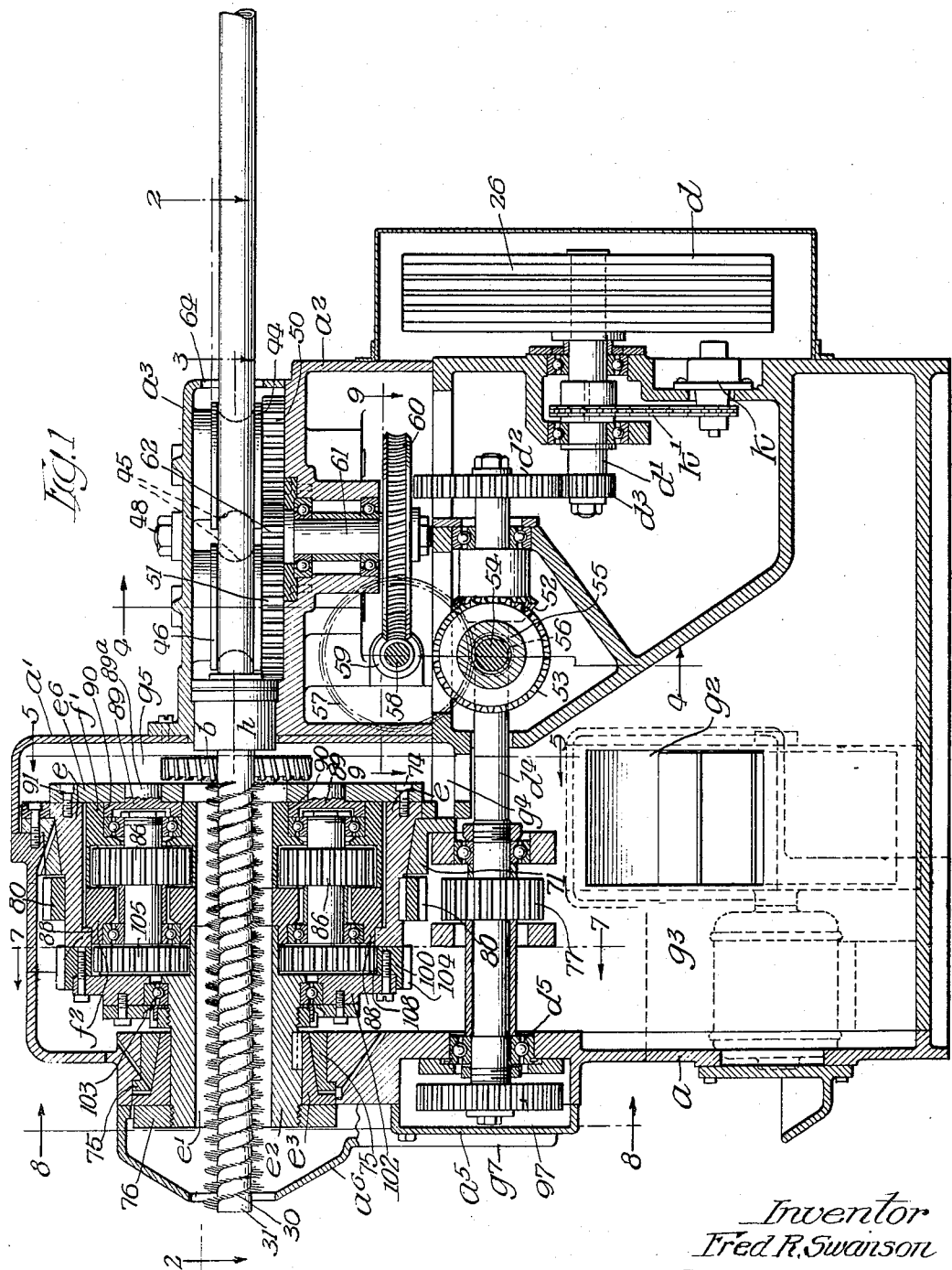

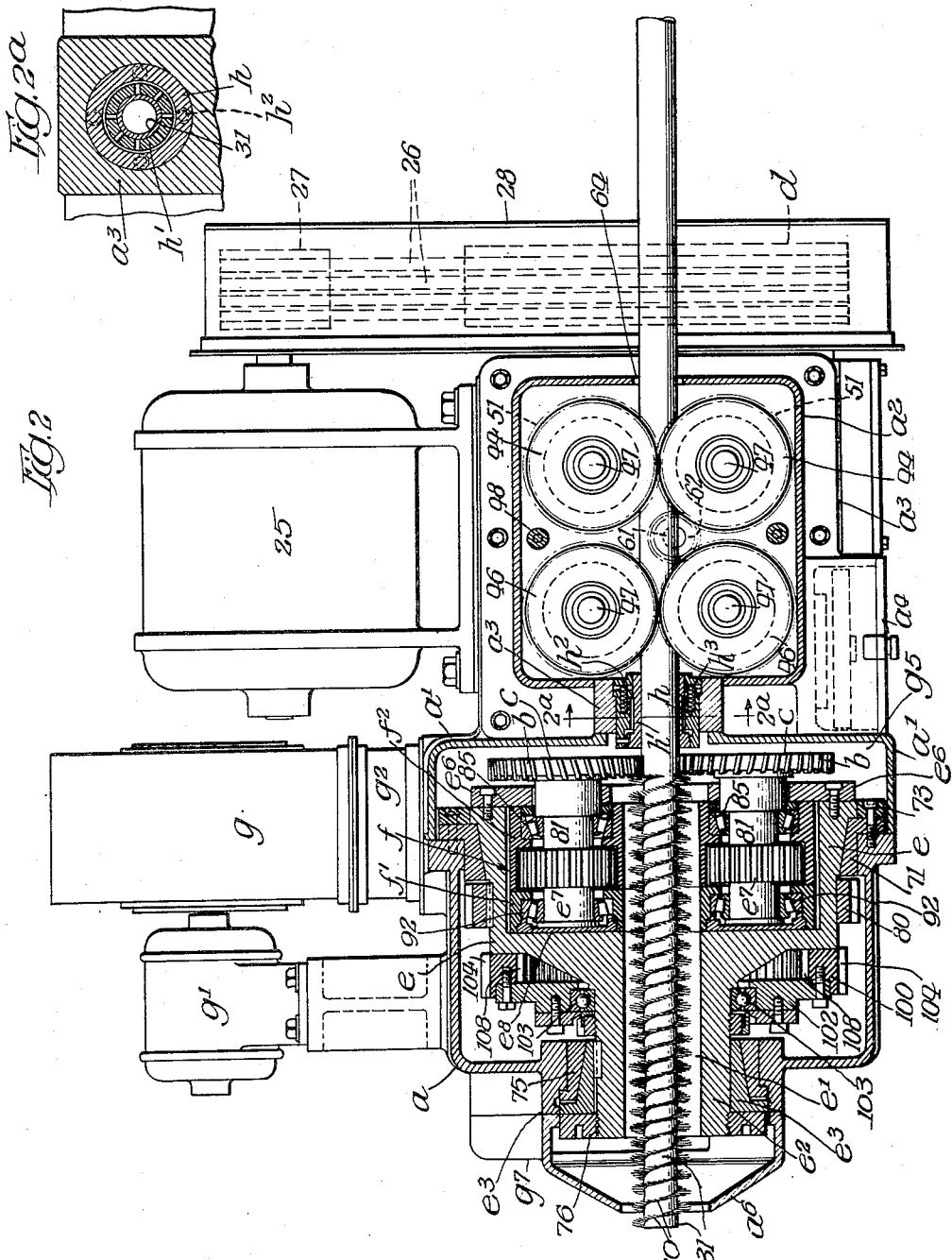

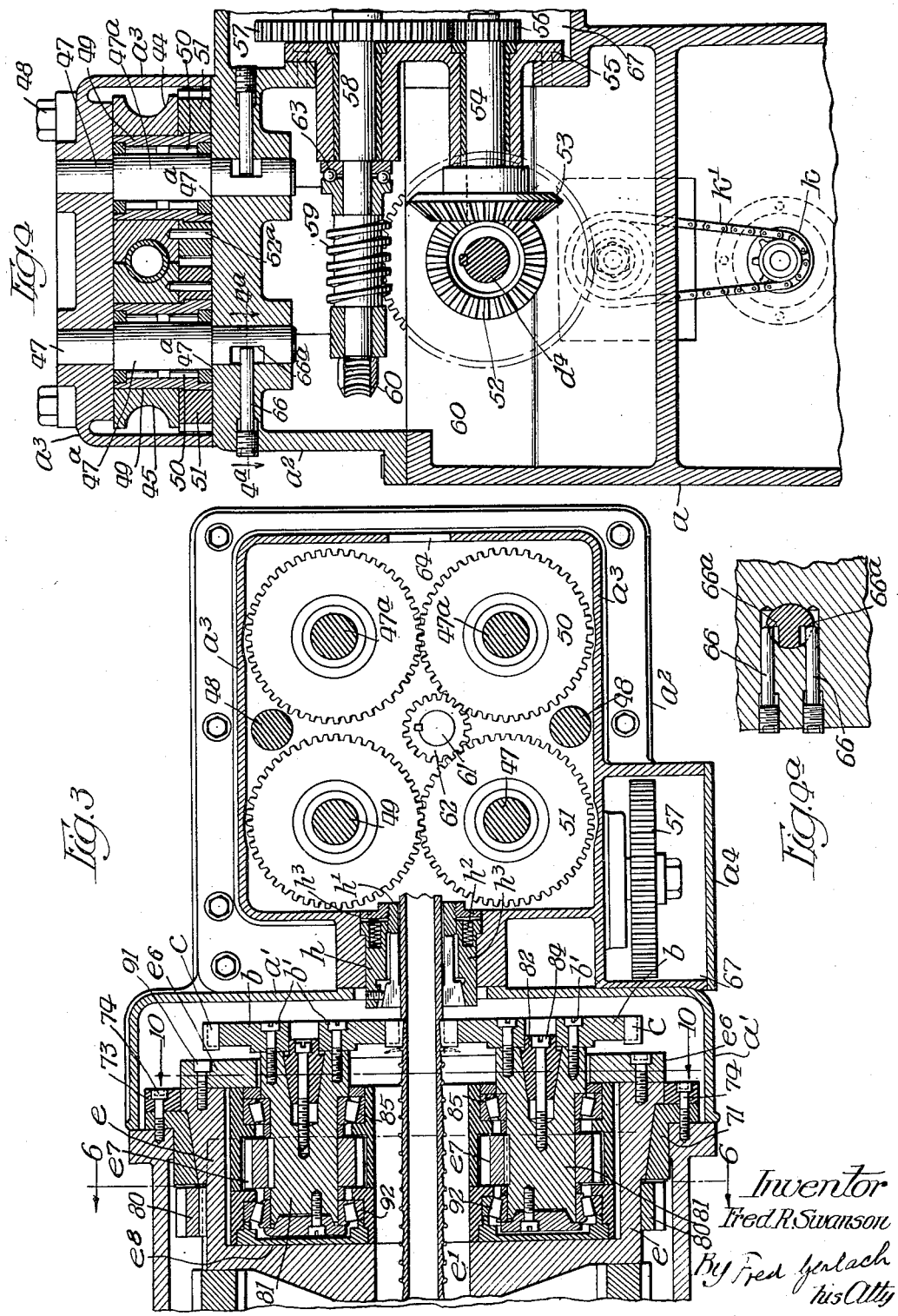

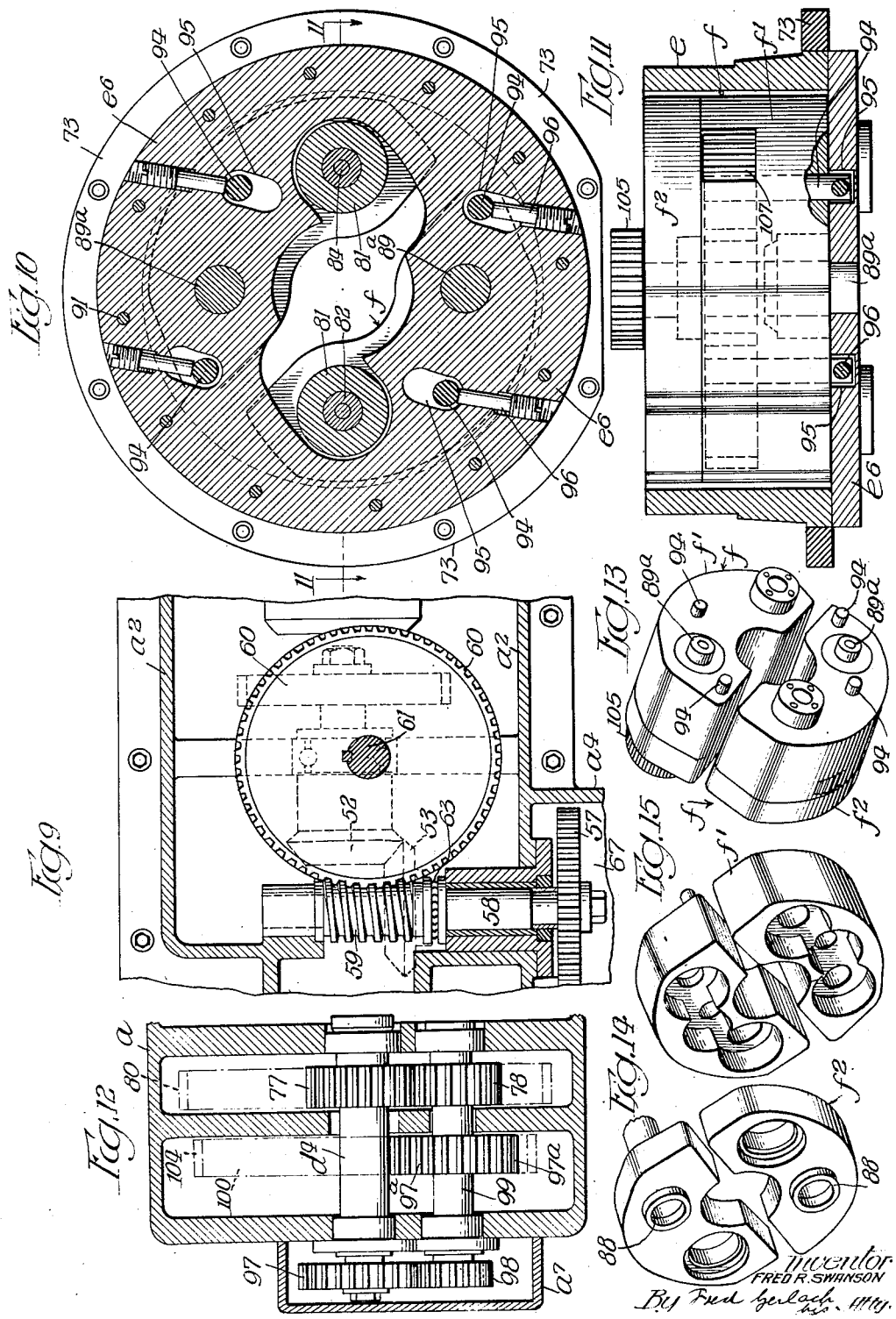

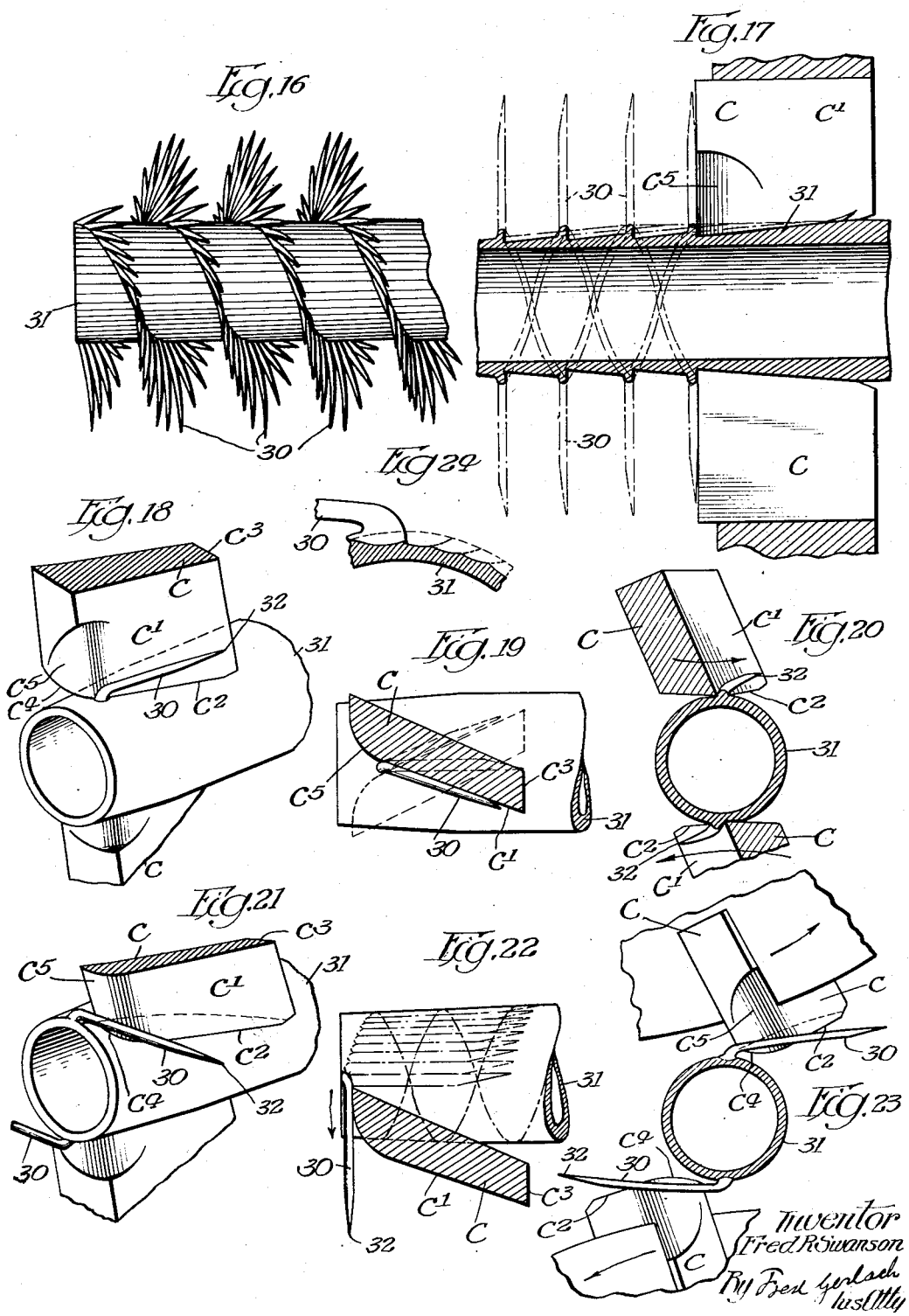

Patented Oct. 29, 1940

2,219,343

UNITED STATES PATENT OFFICE 2,219,343

MACHINE FOR RAISING SPINES

Fred R. Swanson, Rockford, Ill., assignor to Thermek Corporation, Chicago, Ill., a corporation of Delaware Application March 3, 1939, Serial No. 259,520

23 Claims. (Cl. 29—1)

The invention relates to machines for raising spines from stock in the wall of an element, such as a tube, to provide thereon a multiplicity of integral spines which have a high ratio of exposed surface to the mass therein for high efficiency in heat exchange.

One object of the invention is to provide a machine for this purpose to meet the commercial requirements in raising spines with different spacings, of different lengths, and from tubular stock of different diameters to adapt the machine for variations necessary in making heat transfer elements for different uses, and different sizes or different capacities.

Other objects of the invention are to provide a machine for raising integral spines from the stock in a wall or tube with: mechanism for varying the surface speed of rotary cutters relatively to the work to adapt the machine for cutting different metals such, for example, as copper and steel, and obtaining the optimum output while preventing burning away of the cutters; mechanism for adapting the machine for cutting spines from tubular walls of different diameters; mechanism for varying the speed of the movement of the work relatively to the cutters to vary the spacing between the bases of successive spines or the pitch of the helical path along which the spines are cut; mechanism for varying the operation of the rotary cutters for different numbers of spines in a circumferential series around a tubular wall; mechanism for varying the length of the spines; and mechanism for varying the thickness of the spines; and which is adapted to produce a high output.

Another object of the invention is to provide the machine with means for cooling the cutters and the work to prevent burning during high speed operation.

Other objects of the invention will appear from the detailed description.

The invention consists in the several novel features hereinafter set forth and more particularly defined by claims at the conclusion hereof.

In the drawings: Fig. 1 is a central vertical section of a machine embodying the invention. Fig. 2 is a horizontal section taken on line 2—2 of Fig. 1. Fig. 2ᵃ is a section on line 2ᵃ—2ᵃ of Fig. 2. Fig. 3 is a section taken on line 3—3 of Fig. 1. Fig. 4 is a section on line 4—4 of Fig. 1. Fig. 4ᵃ is a section on line 4ᵃ—4ᵃ of Fig. 4. Fig. 5 is a section on line 5—5 of Fig. 1. Fig. 6 is a section on line 6—6 of Fig. 3. Fig. 6ᵃ is a diagrammatic perspective of the gearing for rotating one of the cutters on the carrier. Fig. 7 is a section on line 7—7 of Fig. 1. Fig. 8 is a section on line 8—8 of Fig. 1. Fig. 9 is a section on line 9—9 of Fig. 1. Fig. 10 is a section on line 10—10 of Fig. 3. Fig. 11 is a section on line 11—11 of Fig. 10, the arms in which the cutter-head shafts are mounted being shown in elevation. Fig. 12 is a section on line 12—12 of Fig. 8. Fig. 13 is a perspective of the arms in which the cutter-head shafts are carried. Fig. 14 is a perspective of the outer sections of said arms. Fig. 15 is a perspective of the inner sections of said arms. Fig. 16 is a perspective of a short section of the finished heat exchange element produced by the machine. Fig. 17 is a longitudinal section on an enlarged scale through a tube illustrating diagrammatically the successive and overlapping cuts made by the diametrically opposite cutters in the stock of the wall of the tube in raising the spines. Fig. 18 is a perspective, Fig. 19 a plan, and Fig. 20 a transverse section, illustrating the cutters after a portion of a sliver has been gouged and cut from the pipe by each cutter. Fig. 21 is a perspective, Fig. 22 a plan, and Fig. 23 a transverse section illustrating the diametrically opposite cutters after the slivers have been cut and bent to clear the path of the cutter. Fig. 24 is a transverse section on an enlarged scale illustrating the shape and depth of the successive cuts made in the wall of the tube by the cutters in raising the spines.

The machine is exemplified in connection with the raising of spines 30 from the stock in the outer face of a tube or pipe 31 (Fig. 16). The wall-thickness of the pipe is sufficient to provide stock for the spines and to leave the remaining portion of the wall imperforate for serving as a conduit. The spines are in the form of slivers and are gouged in circumferential succession and longitudinal progression by longitudinal cuts from the wall of the tube by diametrically opposite circular series or gangs of rapidly rotating planetary cutters c on cutter-heads b to provide a multiplicity of spines of high ratio of exposed surface to the mass therein for high efficiency in heat transfer. In raising the spines, each cutter penetrates the stock to cut a point; continues the cut to the length of the spine desired and then bends the sliver out of the path of the rotating cutter so that the spine will extend away from the wall for thermal conduction, leaving the root of the spines attached to the wall. The cutters are continuously rotated around the pipe to provide slivers in circumferential succession and the pipe is moved longitudinally so the cuts will progress lengthwise of the tube. The cutter-heads b are planetary and disposed at diametrically opposite points around the tube 31, so that the cutting stresses will be simultaneously applied at diametrically opposite points to minimize bending stresses on the tube.

The several operating parts of the machine are enclosed and supported in a housing which comprises a main section a in which the mechanism for operating the cutters is enclosed, a cover-section $a^1$ which encloses, and is removable for providing access to, the cutters; a section $a^2$ which is removably secured to the main section $a$ and encloses the gearing for driving the feed-rolls for the stock; a cover-section $a^3$ for the feed-rolls, which is removable to provide access to the feed-rolls for the substitution of rolls for tubes of different diameters; a removable cover-plate $a^4$ for providing access to the gears for driving the stock-feed rolls for the substitution of gears for varying the speed of the advance of the tube 31; a removable cover $a^5$ for providing access to the gears which drive the cutter-heads on their own axes, for the substitution of gears for varying the speed of such rotation; and a discharge spout or cover $a^6$ through which the tube passes after the spines have been raised thereon.

The machine is driven through a pulley $d$ (Fig. 1) disposed outside of housing-section $a$ and fixed to a shaft $d^1$ which is journaled in anti-friction bearings in the housing; a pinion $d^3$ fixed to shaft $d^1$; and a gear $d^2$ fixed to counter-shaft $d^4$ which is journaled in anti-friction bearings in the housing-section $a$. Pulley $d$ is driven by belts 26 from an electric motor 25 which is secured on one side and outside of the housing-section $a$, and a pulley 27 on the motor-shaft. A cover 28 encloses belts 26 and pulleys $d$, 27. The cutting and tube-feed mechanisms are driven from the counter-shaft $d^4$ as hereinafter set forth.

The machine comprises a pair of diametrically opposite planetary cutter-heads $b$, each provided with a series of cutter-blades $c$. The cutter-heads $b$ are mounted in a rotatable carrier $e$ and travel bodily in a circular path with the carrier and are rotatable on their own axes in the carrier so that the cutters $c$ will have planetary movement around the pipe 31 for moving the cutters successively into position to gouge slivers in circumferential succession from the pipe 31; an adjustable mounting for each cutter-head whereby they may be adjusted to bring the cutting paths of blades $c$ to intersect the outer portions of the stock of tubes of pipes of different diameters for raising spines from the stock and for varying the depth of the cuts; gearing for rotating the cutter-heads on their own axes during the rotation of the carrier, said gearing being variable to vary the surface speed of the cutters and the number of cuts made during each rotative cycle of the cutters; and mechanism for feeding the pipe at different speeds through the carriers so that each gang of cutters will operate in helical succession on the wall of the pipe, and which is variable to feed the pipe at different speeds to vary the longitudinal spacing between annular series of spines.

Each cutter-head $b$ is provided with a circular series of cutter-blades $c$ which are fixedly secured in slots in the cutter-head. Each cutter produces a spine during each revolution of the cutter-head on its own axis relatively to the pipe.

The body of each blade is generally rectangular in cross-section and is set at a helical angle in the cutter-head so its cutting edge will enter the metal at the leading corner of the blade and continue the cut longitudinally of the tube as the blade rotates on the axis of the cutter-head. Each blade has a leading face $c^1$ at a helical angle (Figs. 18–23), a side face $c^3$ substantially parallel to the plane of rotation of the cutter, an undercut outer end $c^4$ to form a sharp cutting edge $c^2$ at the outer end and front of the cutter. The cutting edge $c^2$ is inclined outwardly from the meeting corner of the leading face $c^1$ and the side face $c^3$. The cutter is of sufficient width to produce a cut of the maximum length desired for the spline or sliver. During the rotation of the blade the portion of the cutting edge $c^2$ at or near the side face $c^3$ initially enters the metal to start the tapered point 32 of a sliver 30 and as the cutter continues its rotation the cutting edge $c^2$ will continue the cut lengthwise of the tube. The outward inclination of the cutting edge $c^2$ from its leading corner causes the cutting edge $c^2$ to gradually increase the depth of the cut. The trailing corner of the leading face of the blade is curved as at $c^5$ so that, as the trailing side of the blade approaches the stock in the tube and the cut is discontinued, the gouging of the metal from the wall will be discontinued and the sliver will be bent outwardly and transversely or away from the periphery of the tube 31 so the blade will clear the sliver and leave its root integrally attached to the wall of the tube. The cutting edge $c^2$ adjacent the trailing side of the blade is curved inwardly or toward the axis of the cutter-head, as at $c^4$, to cause the blade to discontinue the cut before the last of the trailing side of the blade in its rotation passes the tube 31. This manner of cutting and bending of the splines makes it possible to gouge elongated slivers in close circumferential succession by the blades of each circular series, as shown in Fig. 22, from the stock in the outer periphery of the tube. The tube 31 is continuously advanced by mechanism hereinafter described, so that each circular series of cutters gouge out the slivers in helical succession. The cutting away of the metal of the pipe-wall in gradually increasing depth makes it possible to partially overlap the cuts longitudinally by the two series of cutters to produce spines of greater length than the helical pitch of the slivers (Fig. 17) or the longitudinal spacing between the roots of the spines. The successive cuts of the blades overlap transversely (Fig. 24) so as to utilize the entire outer portion of the stock for the production of spines. As the leading corners of the cutting-edge $c^2$ reach the dead-center between the axis of pipe 31 and axis of the cutter-head on which the cutters rotate, they successively bite into the surface of the metal and start slivers with sharp points and as the remainder of the rotating helically inclined cutting edges $c^2$ pass the dead-center, the cuts are continued and extended deeper into the stock of the wall of the pipe. As the slivers are gouged out of the stock they are bent forwardly by the leading faces $c^1$ of the blade. As the curved trailing portions $c^5$ of the leading face strike the stock, the angle of shear is rapidly changed from its original small value to 90° and the cutting of the slivers is discontinued, leaving them attached to the wall at their roots. As the angle of shear increases the component tending to raise the spines increases so the curved portion $c^5$ slips around the root of the slivers, straightens the sliver to clear the cutter, and bends the sliver so it will project or extend away from the periphery of the pipe. Due to the outward inclination of the cutting edge $c^2$, the pipe-wall is left tapered in thickness and the longitudinally successive cuts may overlap varying extents to vary the spacing between the circumferential row of spines.

Mechanism is provided for continuously feeding pipe 31 through the cutting mechanism so that the cutter-blades on the cutter-heads will cut slivers in longitudinal progression or helical succession from the pipe during the operation of the cutters. This mechanism is variable to vary the rate or speed of the advance of the pipe to vary the longitudinal spacing of the spines along the pipe or the pitch of the helix along which the spines are cut. This feed-mechanism comprises (Figs. 1, 2 and 4) a pair of feed-rolls 44 which are on opposite sides of pipe 31, and a second pair of feed-rolls 46. The rolls of both pairs are provided with complementary concave peripheral grooves 45 for gripping the pipe 31. The rolls 44, 46 are adapted to grip the pipe at longitudinally successive points to firmly support the pipe against transverse bending. These feed-rolls are mounted in the same horizontal plane and are removable for replacement with gripping and feeding rolls provided with peripheral grooves properly shaped for pipes of different diameters. Each of the rolls 44, 46 is rotatable around a stud-shaft 47 which is held against lateral and vertical displacement for firmly gripping the tube 31, in the top walls of housing-section $a^2$ and cover section $a^3$. The latter is removably secured by bolts 48 to the top of housing-section $a^2$ to provide access to feed-rolls for removal and replacement.

The feed-rolls are in the same horizontal plane and, by providing two pairs for gripping the tube 30 at points longitudinally spaced apart, the tube is rigidly supported in advance of the cutting mechanism.

Each of the feed-rolls is removably fitted around a sleeve 49 which is journaled on roller-bearings 50 around its stud-shaft 47. A gear 51 is fixed to the lower end of each sleeve to rotate with each sleeve 49 and connected to drive the feed-roll on the sleeve by a pin 52ª, which is fixed to said gear and extends into a socket in the roll. The gears 51 for feed-rolls 44 mesh with each other and the gears 51 for feed-rolls 46 mesh with each other, to synchronously drive the feed rolls at the respective sides of the tube 31 in opposite directions to advance the pipe.

The mechanism for driving the feed-rolls 44, 46 to feed the work to the cutters comprises (Figs. 1 and 4) a bevel gear 52 fixed to the counter-shaft $d^4$; a bevel gear 53 engaging gear 52 and fixed to a shaft 54 which is journaled in a head 55 which is removably secured to the housing-section $a, a^2$; a pinion 56 fixed to shaft 54; a gear 57 meshing with pinion 56 and fixed to a shaft 58 which is journaled in head 55; a worm 59 fixed to shaft 58; a worm-gear 60 fixed to a vertical shaft 61 which is journaled in housing section $a^2$; and a pinion 62 which is fixed to the upper end of shaft 61 and meshes with one of the gears 44 of each pair of feed-rolls 44, 46. A thrust-bearing 63 is interposed between worm 59 and head 55.

An opening 64 is formed in cover-section $a^3$ through which pipe 31 passes to the feed-rolls. Stud-shaft 47 within its roller-bearing 50 is slightly eccentric, as at 47ª, relatively to its ends which are fitted in housing-section $a^2$ and cover-section $a^3$ to permit the feed-rolls and gears 51 to be adjusted with precision to bring the peripheries of the feed-rolls into clamping relation with the pipe 31. Each of the shafts 47 is rotatable a slight degree to adjust its eccentric portion 47ª by a pair of screw-pins 66, the inner ends of which engage abutments 66ª on opposite sides of shaft 47. The outer ends of screw-pins are accessible from the outside of cover $a^3$ and may be adjusted to lock the shafts against rotation. Rotative adjustment of the shafts 47 moves sleeves 49 and bearings 50 so that the feed-rolls can be set to and from the axis of the pipe 31 to effect firm gripping of the pipe and compensate for commercial tolerances in the diameter of the work.

Gears 56, 57 of the gearing for driving the feed-rolls are disposed in a chamber 67 formed in one side of the housing-sections $a, a^2$. Removable cover-plate $a^4$ closes the open side of chamber 67, and provides access to gears 56, 57 which are removably secured to shafts 54, 58, respectively. By substituting gears of different ratios, the speed of the feed-rolls can be varied, relatively to the countershaft $d^4$ which drives the cutting mechanism.

The machine is adapted for raising spines on the tube 31 with spaces between the bases of the spines of different lengths or the pitch-variation of the helix along which the spines remain joined to the tube, by varying the speed of the advance of tube 31 relatively to the speed of the cutting mechanism. This change of speed is effected by substituting gears 56, 57 of different ratios so that shaft 58, worm 59, worm gear 60, shaft 61, pinion 62 and gears 51 will be driven at different speeds relatively to the countershaft $d^4$ through which the cutting mechanism is driven. For this purpose gears 56, 57 are included and made accessible for gear substitution upon removal of the cover $a^4$. This exemplifies mechanism for providing variations in the speed of the feed of the tube 31 relatively to the operation of the cutting mechanism, to vary the longitudinal spacing between the spines on the tube.

To adapt the machine for feeding tubes 31 of different diameters, feed-rolls 44, 46 are removably connected to their respective driving gears 51. The feed-rolls are confined vertically between said gears and the bottom face of the top of the cover-section $a^3$ and are removably fitted on the sleeves 49 and driving pins 52. Upon removal of the cover-section $a^3$, the feed-rolls can be lifted off their sleeves 49 and replaced with feed-rolls having complementary concave peripheral grooves 45 of different radii to conform to the curvature of pipes of different diameters. For such change it is only necessary to loosen the nuts on bolts 58 and remove the cover-section $a^3$, whereupon the feed-rolls 44, 46 can be lifted off sleeves 49 and replaced by feed-rolls having complementary grooves shaped for feeding pipes of different diameters. This adapts the machine for feeding, on the same axis, pipes of different diameters to the cutting mechanism. To compensate for the variation caused by the change in the radii of the feed-rolls acting on pipes of different diameters, gears 56, 57 may also be changed to maintain any desired rate of feed of the work, with tubes of different or the same diameter.

The cutter-head carrier $e$ is provided with a bore $e^1$ through which the pipe with the spines thereon can pass. The inner end of carrier $e$ is provided with a conoidal bearing which is fitted and journaled in a bearing-ring 71. Carrier $e$ is shouldered against the inner face of bearing-ring 71 and provided with a cylindrical bearing-surface fitting in a cylindrical bearing-ring 73. Rings 71 and 73 are removably secured to housing-section $a$ by bolts 74. Bearing-rings 71, 73 are disposed close to the cutter-heads $c$ to firmly and rotatably support the carrier so as to effectively resist the off-center stresses to which the carrier is subjected during the spine-cutting operations. The outer end of carrier $e$ comprises a cylindrical hub $e^2$. A conoidal bearing-ring $e^3$ is keyed to hub $e^2$ and is fitted in a conoidal bearing-ring 75 which is secured in the housing-section $a$. An adjustable screw-collar 76 is threaded to the outer end of hub $e^2$ to hold bearing-ring $e^3$ in close fitting relation with ring 75.

The mechanism for continuously driving the cutter-head carrier $e$ to move the cutter-heads $b$ in a circular path so that successive blades $c$ on each head will produce cuts in circumferential and, as a result of the advance of the tube, in helical succession, comprises a gear 77 (Figs. 1 and 6) which is fixed to countershaft $d^4$; an idler gear 78 which is journaled on a shaft 79 which is supported in the walls of the housing-section $a$; and a gear-ring 80 which is fixed on carrier $e$.

This carrier moves the cutter-heads $b$ and cutters $c$ around the pipe to cause circumferentially successive cutters $c$ on the cutter-heads $b$ to raise spines in circumferential succession on the non-rotating tube 31 and the rate of feed of the pipe 31 determines the longitudinal spacing between the spines.

The rotary cutter-heads $b$ are mounted in the carrier $e$ at diametrically opposite points so that the stresses applied to tube 31 by the cutters on one head will be opposed by the cutters on the other head so that the bending moments on the tube will be minimized during the cutting of the spines, the cutting operations of the cutters of the gangs being substantially simultaneous. Each cutter-head $b$ is rotatable on its own axis so that the cutters thereon will successively cut spines from the pipe as the cutter-heads are carried around tube 31 by carrier $e$. Each cutter-head $b$ is secured by bolts $b^1$ to a shaft 81. Each cutter-head $b$ is accurately centered on its shaft 81 by a stud 82 which is conically seated in a bore of the shaft, and removably secured thereto by a screw 84. This centering device is provided to accurately center the cutter-head and cutters thereon relatively to the axis of the pipe 31 so that the cutters will produce cuts of uniform depth in the outer periphery of the wall of the pipe.

Each shaft 81 is adjustably mounted in the carrier to move to and from the axis of pipe 31 for cutting spines on tubes of different diameters, and for varying the depth of the cuts on tubes of the same diameter.

Each cutter-shaft 81 is journaled in roller-bearings 92 in an arm $f$ and is suitably held against axial movement in said arm. Each arm is formed of a recessed body-section $f^1$ and a cover-section $f^2$ which fit together and are confined between a head $e^6$ which is removably secured to the inner end of carrier $e$ and the inner face $e^8$ of a wall of carrier $e$ so that the arm will be confined against movement longitudinally of the carrier and will support its shaft 81 against axial movement. Each arm $f$ is fulcrumed in the carrier $e$, being provided with a boss 88 projecting from its outer end which is journaled in a bearing-socket in carrier $e$ and a stud 89 which is fitted into a socket 90 in the inner end of arm $f$ and provided with a stem $89a$ which is journaled in a plate $e^6$ which is removably secured by screws 91 to the inner end of carrier $e$. Each cutter-shaft 81 is journaled in roller-bearings 92 in one of the arms $f$ and suitably held against axial movement in said arm. A gear $e^7$ is fixed to each shaft 81 for rotating said shaft to rotate the cutter-head $b$ and cutters $c$ on the carrier $e$ and around the axis of the cutter-head.

The mechanism for driving gears $e^7$ and shafts 81 on their own axes in the rotatable carrier comprises a gear 97 (Figs. 1 and 8) removably secured to the outer end of countershaft $d^4$; a gear 98, fixed to a shaft 99, which is journaled in housing-section $a^5$, and meshing with gear 97; a gear $97^a$ fixed to shaft 99 inside of housing-section $a$; a gear-ring 100 which is fixed to a head 102 which is journaled on a ball-bearing 103 around the hub $e^2$ of carrier $e$; external gear-teeth 104 on ring 100 which mesh with, and are driven by, gear 97 for rotating said ring and head 102 relatively to the carrier $e$; internal gear-teeth 108 on ring 100 (Fig. 7); gears 105 which are fixed to shaft 86, respectively, and are co-axial with the fulcra of, and journaled in arms $f$, respectively; gears 106 fixed to shafts 86, respectively; idler gears 107 journaled in arms $f$, respectively; and gear $e^7$ fixed to shafts 81 of the cutter-heads $b$, respectively.

Each arm $f$ is formed of sections $f^1$, $f^2$. Each section $f^1$ is provided with recesses for gears 106, 107, $e^7$. The meeting faces of sections $f^1$, $f^2$ are disposed at the outer end of said gears so that, when assembled, said gears will be enclosed and, upon separation, the gears can be assembled in the arms.

The means for setting each of the arms $f$ to adjust the cutter-heads to and from the axis of the tube 31 for raising spines from tubes of different diameters or making cuts of different depths in the wall of the tube, comprises a pair of pins 94 on the inner end of section $f^1$ of the arm $f$ on opposite sides of its fulcrum and projecting into recesses 95 in the head $e^6$ at the inner end of carrier $e$ and adjusting screws 96 threaded to said head and adapted, respectively, to adjust pins 94 to rock the arm $f$ on its fulcrum and move the shaft 86 carried thereby toward or from the axis of pipe 31. To adjust each arm $f$ and the cutter-head $b$ carried thereby, screw 96 at one side of the fulcrum of the arm is screwed inwardly and the screw 96 at the opposite side of the fulcrum is retracted to bring the cutting edges of the cutters the desired distance from the axis of pipe 31. When the arms are set into desired position both of the screws 96 for each arm are tightened to lock the shafts 86, cutter-heads $b$ and the cutters $c$ thereon to rotate on an axis at the desired predetermined distance from the axis of pipe 31. This exemplifies mechanism for adjusting and rotatably supporting the cutter-heads on the rotatable carrier for causing the cutter-blades $c$ to rotate on their own axes, respectively, and cutting spines from the walls of pipes of different diameters and for varying the depth of the cuts in the walls of pipes of the same diameter. This adjustment can be made without change in the gearing on the carrier $e$ for driving shafts 81 and from the outside of the housing. The mounting of idlers 107 in arms $f$ provides for driving the cutter-shafts 81 and gears 106 which are coaxial with the fulcra of said arms while the latter are adjusted into different positions for cutting spines on tubes 31 of different diameter. This mechanism provides for cutting spines from tubes of different diameters and also for varying the depth of the cuts in the wall of the pipe to vary the length of the spines, as hereinafter described.

In practice, it is of importance to vary the speed of rotation of the cutter-heads and cutters relatively to the rotation of the carrier $e$ to vary the number and thickness of spines cut in each circumferential series or during each rotation of the carrier $e$ and also for operating the cutters at different speed for different metals such as steel and copper. When the harder metal is cut it is necessary to reduce the surface speed of the cutters to prevent them from burning. For easy and expeditious variation of the speed of rotation of the cutter-heads on their own axes and relatively to the rotation of carrier $e$, the ends of shafts $d^4$ and 99 are extended to the outer side of one of the side walls of the housing-section $a$ and gears 97, 98 are removably secured to said shafts, respectively, so that gears of different ratios can be substituted. By replacement of gears 97, 98 with gears of different ratios, the speed of the gearing for rotating the cutter-heads on their own axes in arms $f$ may be changed to meet the requirements for variation of the number of spines cut during each rotation of the carrier $e$ or each circumferential series of spines cut. Such gear-changes may also be made for different numbers of spines according to different diameters of the work. Such gear-changes may also be made to operate the cutters at a lower surface speed when the pipe is made of steel. Cover $a^5$ is removably secured to housing section $a$ to provide convenient access to gears 97, 98 for effecting the aforesaid gear-changes.

When the cutters $c$ are operated at high speed the pipe 31 and cutters may become heated. The machine is provided with means for cooling the cutters, the spines and the wall of the pipe. This means includes an air-blower $g$, the casing of which is secured to one side of housing-section $a$, and an electric motor $g^1$ also mounted on said housing-section. The discharge trunk of blower $g$ delivers air through a duct $g^2$ into the chamber $g^3$ in the lower portion of housing-section $a$ and below the cutting mechanism. From said chamber $g^3$ the air is forced through an opening $g^4$ (Fig. 1) to the closed space $g^5$ between housing-section $a^1$ and the inner end of the carrier $e^1$. From chamber $g^3$ the air passes through said space in which the cutters travel, thence between arms $f$, around pipe 31, through the bore $e^1$ of carrier $e$ and through an outlet 110 in spout $a^6$ around tube 31. In passing through chamber $g^5$ the air cools the cutter-mechanism and in passing around the portion of the pipe 31 from which the spines have been cut, the air cools the spines and tube. Some of the air entering chamber $g^3$ circulates around the space at the outer side of bearing-ring 71 in housing section $a$ to cool the carrier and the gear-ring 100. The latter air escapes from the chamber $g^3$ through an outlet $g^6$ in the end wall of housing-section $a$ to an extension $g^7$ of spout $a^6$ from which it escapes through opening 110. The rotation of the cutting-mechanism tends to circulate the air through the housing-sections. This exemplifies means for cooling the cutters and the spines and tubing for preventing the overheating of the cutters and the work when the machine is operated at high speed, also means for cooling the carrier and gearing for rotating the cutter-head shafts.

During the gouging of the spines from the pipe 31 the portion of the pipe engaged by the cutters is subjected to strains which tend to rotate and deflect the pipe at the same time. To prevent such rotation and deflection a sleeve $h$ (Fig. 3) may be secured in the housing-section $a^3$ for the pipe-feeding mechanism between feed-rolls 46 and the cutters. A slidable slotted collet $h^1$, through which the pipe 31 is fed, is slidably guided in said sleeve. Collet $h^1$ is tapered to fit a corresponding tapered or conoidal bore in the end of sleeve $h$ adjacent the cutters. Springs $h^2$ are applied to a ring $h^3$, which is screw-threaded to the other end of the collet, to draw the collet into the tapered bore in the sleeve and to contract it against the periphery of pipe 31. As the feed-rolls advance pipe 31 the latter will exert sufficient endwise force on collet $h^1$ to permit only movement of the collet in the direction of the feed of the pipe and springs $h^2$ press the collet toward the feed-rolls to cause the tapered bore in sleeve $h$ to contract the collet so the latter will grip the tube and prevent rotation and deflection by the cutters. The spring-pressed collet also is adapted to compensate for commercial tolerances in the diameter of the pipe 31. A characteristic of this construction is that the collet is disposed in close proximity to the cutters and to the feed-rolls 46 so that the pipe 31 will be firmly supported adjacent the cutters and between the cutters and the feed-rolls. Said sleeve $h$ is removable from housing-section $a^3$ so that sleeves with collets for different diameters of tubing will be guided to the cutting mechanism.

An oil-pump $k$ (Fig. 1) may be used for lubricating the gearing for driving counter-shaft $d^4$ and the feed-rolls. This pump is driven from shaft $d^1$ by a chain $k^1$ on sprockets fixed to said shaft and the shaft of the pump.

In operation, the rotation of carrier $e$ will rotate the cutter-heads $b$ around the tube 31 and the gearing for rotating the cutter-heads on their own axes will operate the heads at high speed to successively bring the cutter-blades into cutting relation with the outer periphery of the tube at diametrically opposite points so that each cutter will cut a sliver each time it meets the pipe. During the cutting operation pipe 31 will be continuously fed to the cutter-blades. The planetary travel of the cutter-head causes the cutters of each gang to successively cut slivers immediately adjacent the preceding sliver entirely around the pipe so that substantially all portions of the stock in the outer portion of the wall of the pipe will be cut into slivers and bent away from the pipe to form spines for conducting heat from the wall of the tube. The constant feed of pipe 31 causes the slivers cut by the cutters on each cutter-head to be cut from the wall in helical succession. By reason of cutting the base line of each helical series of slivers at an incline to the outer periphery of the wall, sufficient stock is left after the first series of cuts for partially overlapping succeeding cuts.

By providing for the removal and replacement of feed-rolls 44, 46 the machine may be readily adapted for feeding pipes of different diameters. By providing gears 56 and 57 on the outside of the housing-section $a$ which are removable for replacement with gears of different ratios, the speed of the feed-rolls and rate of feed of the pipe can be readily varied to vary the longitudinal spacing between successive annular series of spines or the overlap of succeeding cuts. By providing gears 97, 98 in the gear-train for driving the cutter-heads on their axes in the carrier $e$ at the outside of the housing-section $a$ for substitution of gears of different ratios, the machine is readily adapted to vary the number of spines cut during each rotation of the carrier $e$ or in each circumferential series. By providing cutter-heads which are adjustable toward and from the axis of the pipe 31, as exemplified by arms $f$, the cutting mechanism is adapted to cut spines on tubes of different diameters and also to vary the depth of the cuts in the walls of tubes of the same or different diameters. By means of these variations the machine is adapted to raise spines on tubing or pipes of different diameters, of different lengths, and in greater or lesser number in each annular series and the machine is adapted for cutting metals of different degrees of hardness to meet the requirements of a machine for producing heat transfer tubing with integral spines of varying efficiency and sizes. The means for cooling the cutters and the work makes it possible to operate the machine at optimum speed without burning of the cutters or work and this cooling means also serves to cool the gearing for driving the cutters.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a machine for cutting and raising spines on cylindrical stock, the combination of a rotatable carrier, a cutter-head eccentrically mounted in the carrier for bodily rotation and rotatable therein on its own axis, a cutter mounted on the head to move in a planetary path and provided with a cutting edge for digging into, and passing out of, the face of cylindrical metal stock to cut out and raise a spine and with means for terminating the cut to leave the base of the spine attached to the stock, means for supporting the stock while being operated on, gearing for rotating the carrier and gearing for rotating the cutter-head on its own axis in the carrier, said gearing being changeable to vary the number of spines raised by the cutter during each revolution of the carrier.

2. In a machine for cutting and raising spines on cylindrical stock, the combination of a rotatable carrier, a cutter-head eccentrically mounted in the carrier for bodily rotation and rotatable therein on its own axis, a gang of planetary cutters mounted on the head, each provided with a cutting edge for digging into, and passing out of, the face of cylindrical metal stock to cut out and raise a spine and with means for terminating the cut to leave the base of the spine attached to the stock, means for supporting the stock while being operated upon, gearing for rotating the carrier and gearing for rotating the cutter-head on its own axis in the carrier, said gearing being changeable to vary the number of spines raised during each revolution of the carrier.

3. In a machine for cutting and raising spines on cylindrical stock, the combination of a rotatable carrier, a cutter-head eccentrically mounted in the carrier for bodily rotation and rotatable therein on its own axis, a gang of planetary cutters mounted on the head, each provided with a cutting edge for digging into, and passing out of, the face of cylindrical metal stock to cut out and raise a spine and with means for terminating the cut to leave the base of the spine attached to the stock, means for supporting the stock to be operated upon, gearing for rotating the carrier and gearing for rotating the cutter-head on its own axis in the carrier comprising a pinion fixed to rotate with the cutter-head and a gear connected to drive said pinion and rotatable relatively to and journalled on the carrier, and mechanism for driving said gear.

4. In a machine for cutting and raising spines on cylindrical stock, the combination of a rotatable carrier, a cutter-head eccentrically mounted in the carrier for bodily rotation and rotatable therein on its own axis, a gang of planetary cutters mounted on the head, each provided with a cutting edge for digging into, and passing out of, the face of cylindrical metal stock to cut out and raise a spine and with means for terminating the cut to leave the base of the spine attached to the stock, means for supporting the stock to be operated upon, gearing for rotating the carrier and gearing for rotating the cutter-head on its own axis in the carrier comprising a gear rotatable relatively to and journaled on the carrier, and gearing for driving said gear, said gearing being changeable to operate the cutters to raise different numbers of spines during each revolution of the carrier.

5. In a machine for cutting and raising spines on cylindrical stock, the combination of a rotatable carrier, an arm pivotally supported in and rotatable with the carrier, a cutter-head mounted in said arm, a gang of planetary cutters on the cutter-head, each provided with a cutting edge for digging into and passing out of the metal in the face of the stock and raising a spine and with means for terminating the cut to leave the base of the spine attached to the stock, means for supporting the stock while being operated on, mechanism for rotating the carrier, mechanism for rotating the cutter-head on the carrier for raising spines from the stock in circumferential succession, means for relatively moving the cutter and stock for presenting successive portions of the stock to the cutter, and means for adjusting the arm in the carrier to vary the cutting plane of the cutters.

6. In a machine for cutting and raising spines on cylindrical stock, the combination of a rotatable carrier, an arm pivotally mounted in and rotatable with the carrier, a shaft journalled in the arm, a cutter-head fixed to said shaft, a gang of planetary cutters on the cutter-head, each provided with a cutting edge for digging into and passing out of the metal in the face of the stock and raising a spine and with means for terminating the cut to leave the base of the spine attached to the stock, means for supporting the stock while being operated on, mechanism for rotating the carrier, mechanism for rotating the shaft in the carrier for raising spines from the stock in circumferential succession, means for relatively moving the cutter and stock for presenting successive portions of the stock to the cutter, and means for adjusting the arm in the carrier to vary the cutting path relatively to the axis of the carrier.

7. In a machine for cutting and raising spines on cylindrical stock, the combination of a rotatable carrier, a cutter-head eccentrically mounted in the carrier, a gang of planetary cutters on the cutter-head, each provided with a cutting edge for digging into and passing out of the metal in the face of the stock and raising a spine and with means for terminating the cut to leave the base of the spine attached to the stock, means for supporting the stock while being operated on, mechanism for rotating the carrier, and mechanism for rotating the cutter-head in the carrier, said mechanism being changeable to drive the cutter head at different speeds relatively to the rotation of the carrier, and vary the number of cuts during each planetary cycle of the cutters, and means for relatively moving the cutter and stock for presenting successive portions of the stock to the cutter.

8. In a machine for cutting and raising spines on cylindrical stock, the combination of a rotatable carrier, a cutter-head eccentrically mounted in the carrier for bodily rotation and rotatable therein on its own axis, a gang of planetary cutters mounted on the head, each provided with a cutting edge for digging into, and passing out of, the face of cylindrical metal stock to cut out and raise a spine and with means for terminating the cut to leave the base of the spine attached to the stock, means for supporting the stock to be operated upon, gearing for rotating the carrier and gearing for rotating the cutter-head on its own axis in the carrier comprising a gear disposed within the carrier, a gear-ring rotatable independently of and journalled on the carrier and mechanism for driving said ring.

9. In a machine for cutting and raising spines on cylindrical stock, the combination of a rotatable cutter provided with a cutting edge for digging into and passing out of the stock to cut out and raise a spine and with means for terminating the cut to leave the base of the spines attached to the stock, means for supporting the stock while being operated on, means for continuously rotating the cutter to successively raise spines from the stock, means for relatively moving the cutter and the stock for presenting successive portions of the stock to the cutter, and means for varying the cutting path of the cutter relatively to the stock so that the cutter will rotate continuously in different predetermined paths.

10. In a machine for cutting and raising spines on cylindrical stock, the combination of a rotatable gang of cutters, each provided with a cutting edge for digging into and passing out of the stock to cut out and raise a spine and with means for terminating the cut to leave the base of the spines attached to the stock, means for supporting the stock while being operated on, means for continuously rotating the cutters to successively raise spines from the stock, means for relatively moving the cutters and the stock for presenting successive portions of the stock to the cutters, and means for varying the cutting path of the gang of cutters relatively to the stock so that the cutters will rotate continuously in different paths.

11. The combination with a machine for cutting and raising spines on cylindrical stock, having a planetary cutter, provided with a cutting edge for digging into and passing out of the stock to cut out and raise a spine and with means for terminating the cut to leave the base of the spines attached to the stock, means for supporting stock of different diameters on substantially the same axis while being operated on, means for continuously rotating the cutter on its own axis and around cylindrical stock to successively raise spines from the stock, means for relatively moving the cutter and the stock for presenting successive portions of the stock to the cutter, of means for adjusting the cutting path of the cutter relatively to the stock so that the cutter will continuously rotate in different predetermined paths for raising spines on stock of different diameters.

12. The combination with a machine for cutting and raising spines on cylindrical stock, having a planetary gang of cutters, each provided with a cutting edge for digging into and passing out of the stock to cut out and raise a spine and with means for terminating the cut to leave the base of the spines attached to the stock and means for supporting stock of different diameters on substantially the same axis while being operated upon, means for rotating the cutters on their own axis and around the cylindrical stock to successively raise spines from the stock, means for relatively moving the cutters and the stock for presenting successive portions of the stock to the cutter, and means for adjusting the gang of cutters relatively to the stock so that the cutters will continuously rotate in different predetermined paths for raising spines on stock of different diameters.

13. In a machine for cutting and raising spines, the combination of a rotatable carrier, a cutter-head eccentrically mounted in the carrier for bodily rotation and rotatable therein on its own axis, a planetary cutter mounted on the head and provided with a cutting edge for digging into, and passing out of, the face of cylindrical metal stock to cut out and raise a spine and means for terminating the cut to leave the base of the spine attached to the stock, means for supporting the stock while being operated on, means for relatively moving the cutter and the stock for presenting successive portions of the stock to the cutter, mechanism for simultaneously rotating the carrier and rotating the cutter-head in the carrier, and means for adjusting the cutter-head in the carrier for continuous operation in different predetermined cutting paths.

14. In a machine for cutting and raising spines, the combination of a rotatable carrier, a cutter-head eccentrically mounted in the carrier for bodily rotation and rotatable therein on its own axis, a gang of planetary cutters mounted on the head, each provided with a cutting edge for digging into, and passing out of, the face of cylindrical metal stock to cut out and raise a spine and means for terminating the cut to leave the base of the spine attached to the stock, means for supporting stock while being operated on, means for relatively moving the cutters and the stock for presenting successive portions of the stock to the cutter, mechanism for simultaneously rotating the carrier and rotating the cutter-head in the carrier, and means for adjusting the cutter-head in the carrier so that the gang of cutters will be continuously operated in different predetermined cutting paths for raising spines on stock.

15. In a machine for cutting and raising spines on cylindrical stock, the combination of a rotatable carrier, a cutter-head eccentrically mounted in the carrier for bodily rotation and rotatable therein on its own axis, a cutter mounted on the head and provided with a cutting edge for digging into, and passing out of, the face of cylindrical metal stock to cut out and raise a spine and means for terminating the cut to leave the base of the spine attached to the stock. means for supporting stock of different diameters on the same axis while being operated upon. means for relatively moving the cutter and the stock for presenting successive portions of the stock to the cutter, mechanism for simultaneously rotating the carrier and rotating the cutter-head in the carrier, and means for adjusting the cutter-head in the carrier so that the cutter will be continuously operated in different predetermined cutting paths for raising spines on stock of different diameters.

16. In a machine for cutting and raising spines, the combination of a rotatable carrier, a cutter-head eccentrically mounted in the carrier for bodily rotation and rotatable therein on its own axis, a gang of cutters mounted on the head, each provided with a cutting edge for digging into, and passing out of, the face of cylindrical metal stock to cut out and raise a spine, and means for terminating the cut to leave the base of the spines attached to the stock, means for supporting stock of different diameters on the same axis while being operated on, means for relatively moving the cutter and the stock for presenting successive portions of the stock to the cutters, mechanism for simultaneously rotating the carrier and rotating the cutter-head in the carrier, and means for adjusting the cutter-head in the carrier so that the cutters will be continuously operated in different determined cutting paths for raising spines on stock of different diameters.

17. In a machine for cutting and raising spines on cylindrical stock, the combination of a planetary cutter provided with a cutting edge for digging into, and passing out of, a face of metal stock to cut out and raise a spine and with means for terminating the cut to leave the base of the spine attached to the stock, means for operating the cutter to successively raise spines from the stock, means for supporting and feeding the stock relatively to the cutter to present successive portions of the stock to the cutter, and means for driving the feed-means, said feed-means being changeable to vary the rate of feed of the stock to the cutters to vary the longitudinal spacing between the spines.

18. In a machine for cutting and raising spines on cylindrical stock, the combination of a rotatable carrier, a cutter-head rotatable in the carrier, a gang of planetary cutters on the head, each provided with a cutting-edge for digging into, and passing out of, a face of metal stock to cut out and raise a spine and with means for terminating the cut to leave the base of the spine attached to the stock, means for operating the carrier and head for successively raising spines in circumferential succession from the stock, means for supporting and feeding the stock relatively to the cutters to present successive portions of the stock to the cutter, and means for driving the feed-means, said feed-means being changeable to vary the rate of feed of the stock for varying the longitudinal spacing of the spines.

19. In a machine for cutting and raising spines on cylindrical stock, the combination of a gang of planetary cutters each provided with a cutting-edge for digging into, and passing out of, a face of metal stock to cut out and raise a spine and with means for terminating the cut to leave the base of the spine attached to the stock, means for operating the cutter to successively raise spines from the stock in circumferential succession, means for supporting and feeding the stock relatively to the cutters to present longitudinally successive portions of the stock to the cutter, means for driving the feed-means, said feed-means being changeable to vary the rate of feed of the stock to the cutters to vary the longitudinal spacing of the spines, and means for varying the speed of the cutters to vary the number of spines raised during each planetary cycle of the cutters.

20. In a machine for cutting and raising spines from cylindrical stock, the combination of a gang of planetary cutters, each provided with a cutting-edge for digging into, and passing out of the periphery of the stock, to cut out and raise a spine and with means for terminating the cut to leave the base of the spine attached to the stock, means for operating the cutter to successively raise spines in circumferential succession from the stock, feed-rolls engaging and advancing the stock for presenting longitudinally successive portions of the stock to the cutter, said rolls being removable and replaceable with rolls adapted for engaging stock of different diameters on the same axis, and means for driving the feed-rolls, said driving means being changeable to vary the rate of feed of the stock to the cutters for varying the longitudinal spacing of the spines.

21. In a machine for cutting and raising spines from cylindrical metal stock, the combination of a carrier rotatable around the stock, a pair of planetary cutter-heads rotatably mounted at diametrically opposite points in the carrier, each head being provided with a gang of cutters, each cutter being provided with a cutting-edge for digging into, and passing out of, the face of the stock to cut and raise a spine and with means for terminating the cut to leave the base of the spine attached to the stock, means for feeding the stock to be operated upon for presenting successive portions of the metal to the cutters, gearing for rotating the carrier, and gearing for rotating the cutter-heads on their own axes during the rotation of the carrier to simultaneously cut helical series of spines in circumferential succession on diametrically opposite points of the stock, said gearing being changeable so that the speed of the cutter-heads may be varied to vary the number of spines raised during each planetary cycle of the cutters.

22. Means for cooling a machine for cutting and raising spines on cylindrical stock, provided with a planetary cutter-head, provided with a gang of cutters, each cutter being provided with a cutting-edge for digging into and passing out of the face of the stock to cut and raise a spine and with means for terminating the cut to leave the base of the spine attached to the stock, gearing for driving said cutter-head, means for feeding the stock to the cutters, comprising a housing around the head and gearing and through which the stock is fed, and means for circulating air through the housing to cool the cutters and around the stock on which the spines have been raised to cool the stock.

23. Means for cooling a machine for cutting and raising spines on cylindrical stock, provided with a rotatable carrier, a planetary cutter-head rotatably supported by the carrier, a gang of cutters on the head, each cutter being provided with a cutting-edge for digging into and passing out of the face of the stock to cut and raise a spine and with means for terminating the cut to leave the base of the spine attached to the stock, gearing for driving said carrier and cutter-head, a housing around the carrier, cutting-head and gearing, the carrier having an opening extending longitudinally therethrough for the stock after the spines have been raised thereon, comprising means for circulating air through the housing to cool the cutters and through said opening and around the stock to cool the stock on which the spines have been raised.

FRED R. SWANSON.